(12) United States Patent
Chen et al.

(10) Patent No.: US 7,058,176 B2
(45) Date of Patent: Jun. 6, 2006

(54) COVER STRUCTURE FOR PORTABLE ELECTRONIC DEVICE

(75) Inventors: Chia-Hua Chen, Tu-chen (TW); Qing Ming Huang, Shenzhen (CN)

(73) Assignee: Fih Co., Ltd., Shindian (TW)

( * ) Notice: Subject to any disclaimer, the term of this patent is extended or adjusted under 35 U.S.C. 154(b) by 314 days.

(21) Appl. No.: 10/625,052

(22) Filed: Jul. 22, 2003

(65) Prior Publication Data

US 2004/0169044 A1 Sep. 2, 2004

(30) Foreign Application Priority Data

Feb. 27, 2003 (TW) .............................. 92203122 U

(51) Int. Cl.
*H04M 9/00* (2006.01)
(52) U.S. Cl. .............................. 379/433.13; 455/575.3; 455/16; 455/250
(58) Field of Classification Search .......... 379/433.13; 455/575.3; 16/250
See application file for complete search history.

(56) References Cited

U.S. PATENT DOCUMENTS

| | | | |
|---|---|---|---|
| 5,761,300 A | 6/1998 | Domoleczny | |
| 6,209,173 B1 | 4/2001 | Salter et al. | |
| 6,424,823 B1 * | 7/2002 | Moles | 379/433.13 |
| 6,754,507 B1 * | 6/2004 | Takagi | 379/433.13 |

* cited by examiner

*Primary Examiner*—Ahmad F. Matar
*Assistant Examiner*—Quynh H. Nguyen
(74) *Attorney, Agent, or Firm*—Wei Te Chung

(57) ABSTRACT

A cover structure (1) for a portable electronic device includes a front cover (10) and a back cover (20), wherein the front cover forms a main joint portion (120), the back cover forms a shell (22), the main joint portion has an arcuate wall (121), and a recessed portion (1210) is formed on the arcuate wall. When assembling the front and back covers, a knuckle (12) is formed by means of the shell engaging with the main joint portion on the recessed portion thereof.

13 Claims, 6 Drawing Sheets

US 7,058,176 B2

COVER STRUCTURE FOR PORTABLE ELECTRONIC DEVICE

FIELD OF THE INVENTION

The present invention relates to a structure of an electronic device, and particularly to a cover structure for a portable electronic device.

BACKGROUND OF THE INVENTION

A wide variety of cover structures for portable electronic devices, particularly for phones, are available today. Cover structures for folding or flip phones are complicated since a hinge mechanism is necessary to pivotally connect first and second housings of the phone to allow movement between closed and open positions. FIG. 5 shows a structure for a flip phone disclosed in U.S. Pat. No. 5,761,300. Referring to this patent, a flip element 103, a rear housing portion 229 and a front housing portion 231 can be assembled together using a hinge mechanism. The flip element 103 includes a pair of hinge knuckles 203, 207, and is a one-piece integrally formed unit. FIG. 6 shows a structure of a flip 14 for a folding phone disclosed in U.S. Pat. No. 6,209,173. The flip 14 comprises a front cover portion 141 and a back cover portion 142. Each cover portion 141, 142 forms a curved portion 391, 392. When the cover portions 141, 142 are assembled, the curved portions 391, 392 engage with each other to form a hinge tube 39 to encase a hinge mechanism.

However, as regards the first above reference, it is difficult to form the flip element 103 so that it has two or more different colors, with the colors being distinct and having clear boundaries therebetween. This is because the flip element 103 is a uniform, integral structure. Unlike in the first reference, the flip 14 of the second above reference can be easily formed in two different colors. That is, the front cover portion 141 and the back cover portion 142 can each be formed of a different color, wit a distinct boundary being defined where the curved portions 391, 392 join to form the hinge tube 39. However, as the flip 14 rotates around the hinge mechanism, the hinge tube 39 can be easily split or broken under the torque produced, because the tube 39 is constituted of the two separate curved portions 391, 392.

Therefore, an improved cover structure for a portable electronic device is desired which overcomes the disadvantages of the prior art.

SUMMARY OF THE INVENTION

A main object of the present invention is to provide a durable cover structure for a portable electronic device.

Another object of the present invention is to provide a cover structure for a portable electronic device in which the cover can be multi-color with distinct region boundaries between the colors.

A cover structure for a portable electronic device comprises a front cover and a back cover, wherein the front cover forms a main joint portion, the back cover forms a shell, the main joint portion has an arcuate wall, and a recessed portion is formed on the arcuate wall. When assembling the front and back covers, a knuckle is formed by means of the shell engaging with the main joint portion on the recessed portion thereof.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
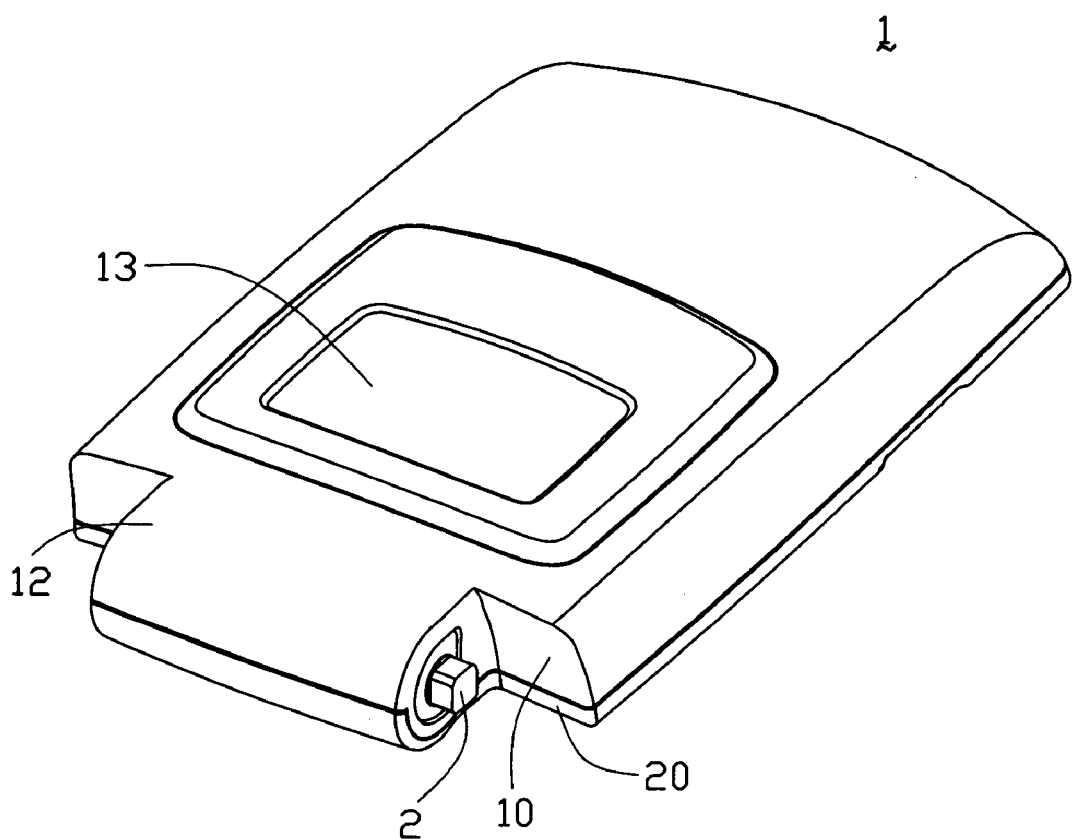
FIG. 1 is a perspective view of a cover structure assembled with a hinge mechanism in accordance with a preferred embodiment of the present invention.

Referring now to the drawings in detail, FIG. 1 shows a flip cover 1 for a folding mobile phone (not shown). The flip cover 1 has a front cover 10 and a back cover 20 which join together to house electronic elements, such as an LCD display 13, an earpiece (not shown), and associated circuitry. The flip cover 1 forms a knuckle 12 for encasing a hinge mechanism 2. Combining the flip cover 1 with a main body (not shown) using the hinge mechanism 2 forms the folding mobile phone. In the preferred embodiment, the knuckle 12 has a width less than that of both the front cover 10 and the back cover 20, to allow easy assembly of the folding mobile phone. If desired, the knuckle 12 can be designed to have a width equal to or greater than the width of both the front cover 10 and the back cover 20.

Figure 2:
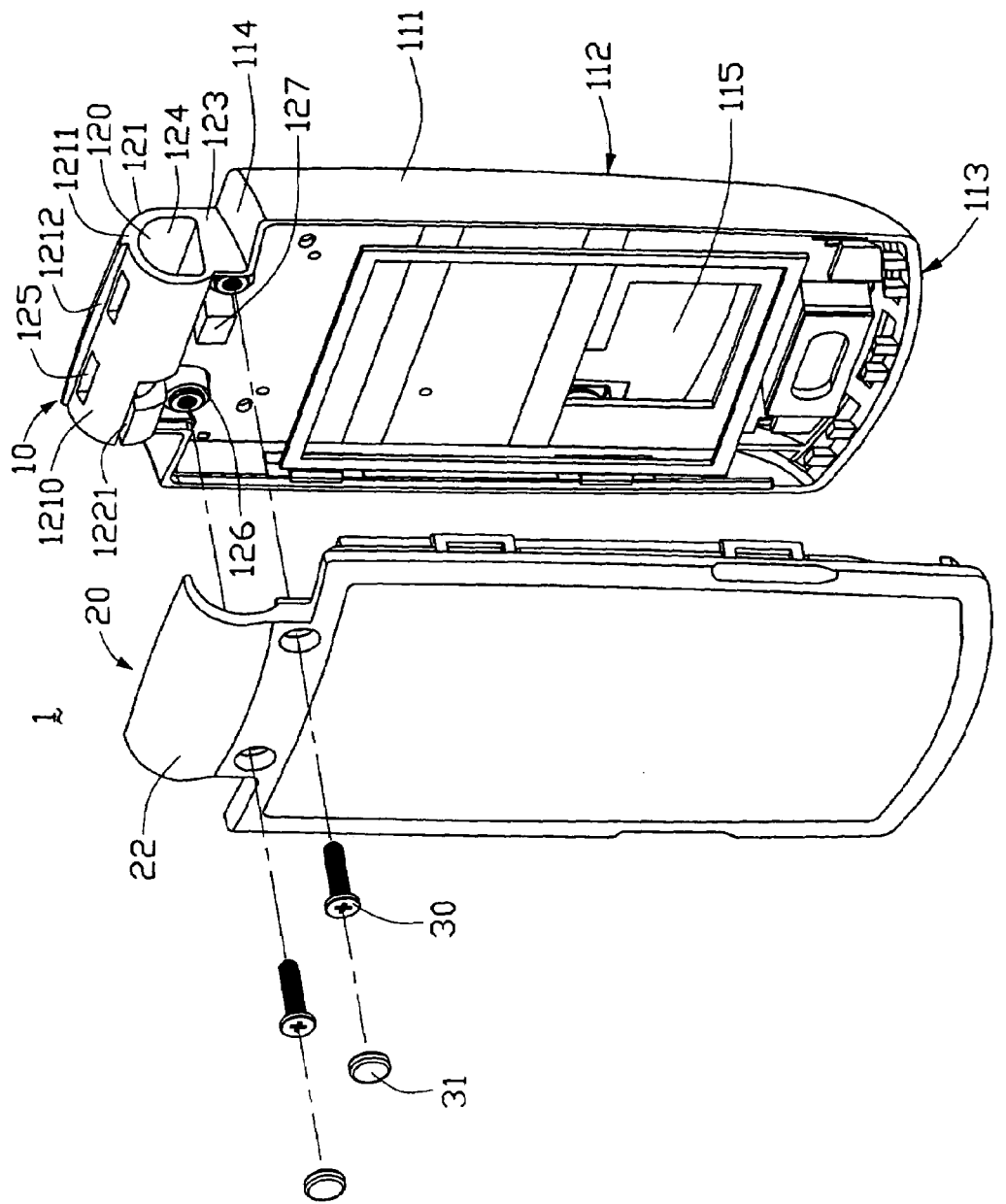
FIG. 2 is an exploded, isometric view of the cover structure of FIG. 1 without the hinge mechanism.

FIG. 2 is a disassembled view of the flip cover 1 of FIG. 1. The front cover 10 includes two sidewalls 111, a bottom wall 112, a rear wall 113, and a top wall 114. A main joint portion 120 extends from the top wall 114 of the front cover 10. The main joint portion 120 is preferably in the form of a casing tube defining a circular channel 124 extending therethrough. The main joint portion 120 includes an arcuate wall 121 and a first support neck 123. The first support neck 123 supports the arcuate wall 121 and joins the arcuate wall 121 with the too wall 114. The arcuate wall 121 and the first support neck 123 cooperatively define the circular channel 124, which is for receiving the hinge mechanism 2. The arcuate wall 121 forms a recessed portion 1210 on its outer surface, and thus forms a protruding portion 1211 with a first edge 1212 adjacent the recessed portion 1210. The recessed portion 1210 defines two openings 125 therethrough and a groove 1221 therein, for passage of conductors. The two openings 125 are spaced apart a distance, and are adjacent a first edge 1212 of the protruding portion 1211. Walls 111 to 114 and the main joint portion 120 together define a first receiving space 115 therebetween. In an upper region of the receiving space 115 defined by the first support neck 123, two screw hole posts 126 and a rectangular post 127 extend forwardly from the inside of the bottom wall 112. Each screw hole post 126 defines a screw hole (not labeled) therein. It is understood that the main joint portion 120 may be designed to have other desired shapes instead of that of a casing tube. Such other shaves may also include the arcuate wall 121.

Figure 3:
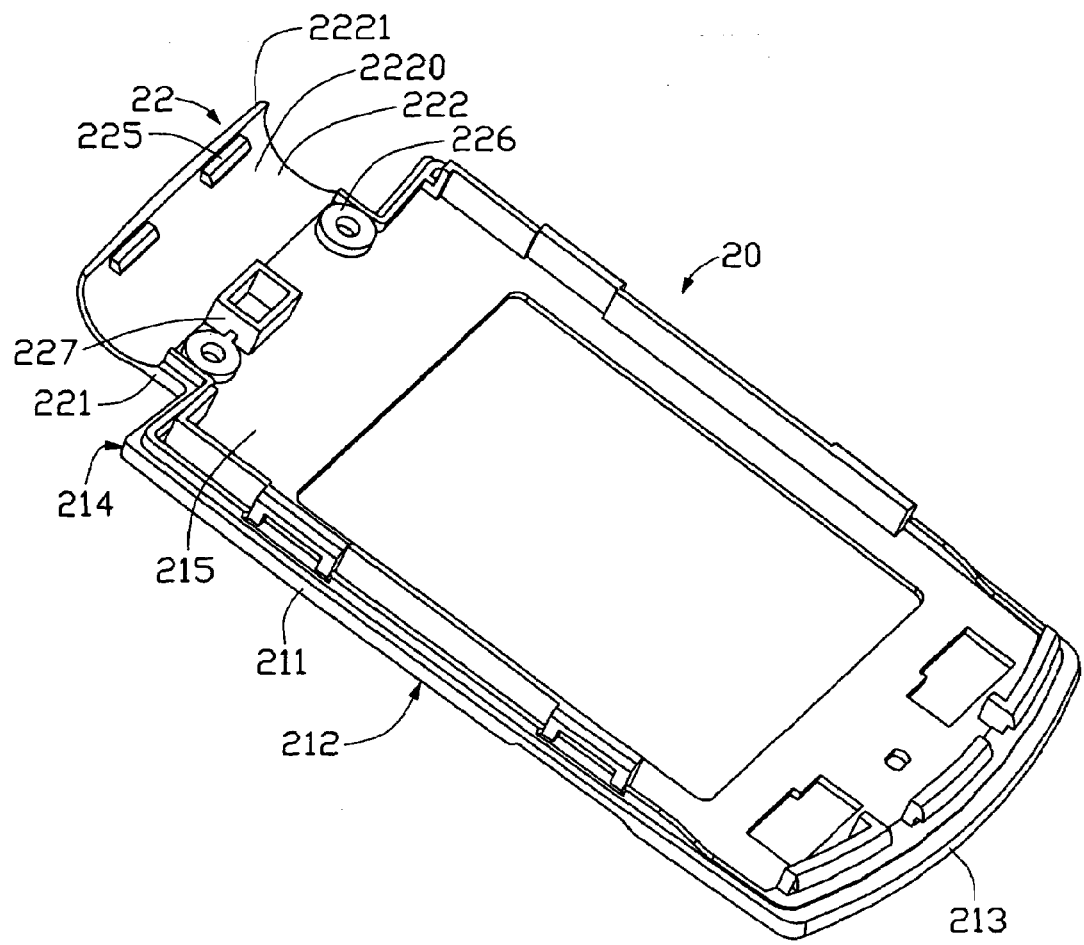
FIG. 3 is a perspective view of one portion of the cover structure of FIG. 1.

Referring to FIG. 3 together with FIG. 2, FIG. 3 shows the back cover 20. The back cover 20 includes two lateral walls 211, a front wall 212, an upper wall 214, and a lower wall 213. A mating shell 22 sweeps upwardly from the front wall 212 of the back cover 20, and includes a second support neck 221 and a curved plate 222. The curved plate 222 has an inner face 2220 and a second edge 2221, which can closely fit with the recessed portion 1210 and with the first edge 1212 of the arcuate wall 121 respectively. The walls 211 to 214 and the mating shell 22 define a second receiving space 215. Two bolt hole posts 226 are formed at the second support neck 221 of the back cover 20, each defining a bolt hole (not labeled) through the back cover 20. The bolt holes through the bolt hole posts 226 correspond in position with the screw holes through the two screw bole posts 126. A holding block 227 extends forwardly from the bottom of the second receiving space 215, and is for fixing of the post 127 therein. Two projections 225 extend forwardly from the inside of the mating shell 22, for being retained in the two openings 125 respectively. Two screws 30 and two caps 31 are available to fix the back cover 20 to the front cover 10.

Figure 4:
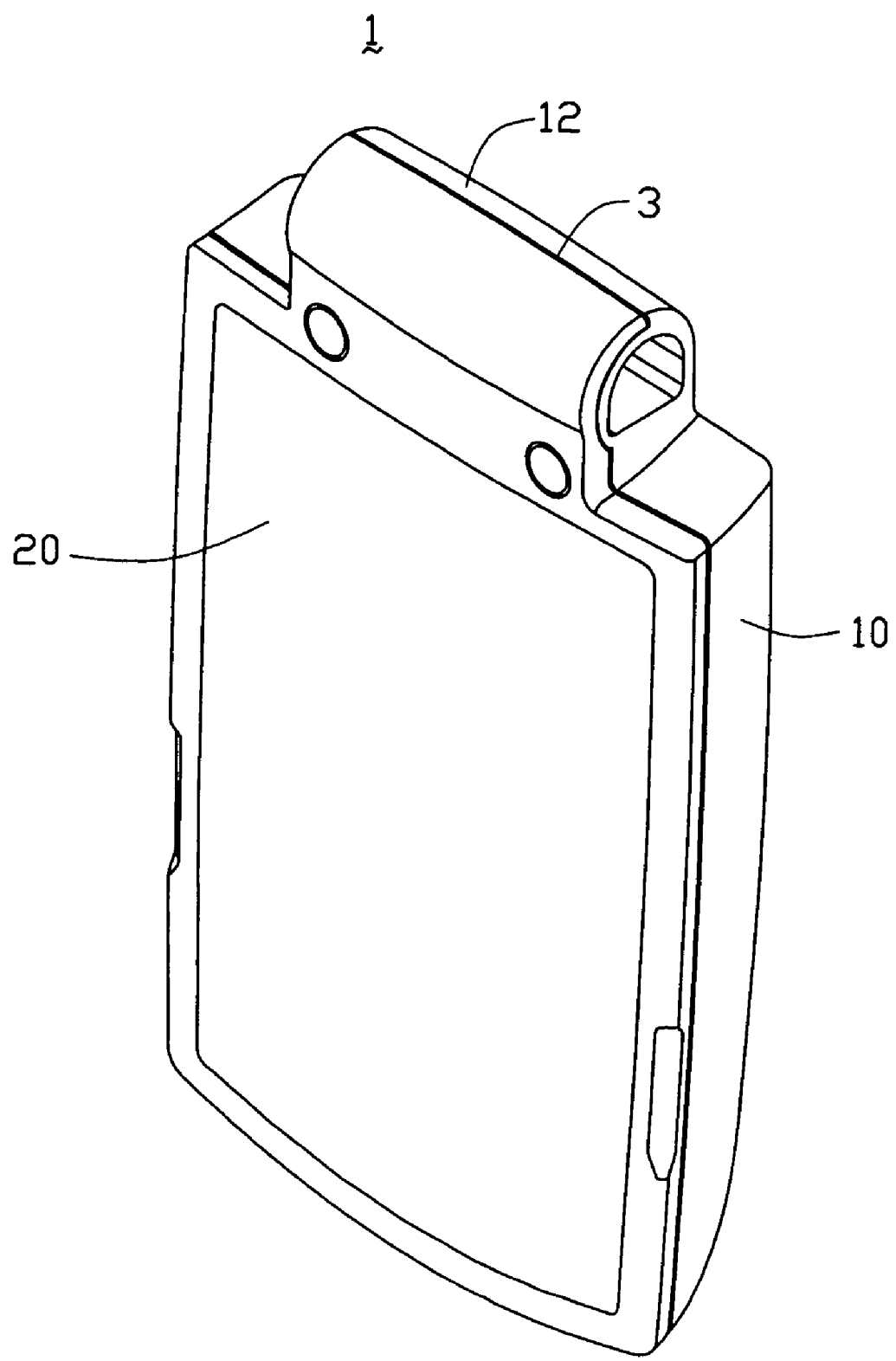
FIG. 4 is a perspective view of the cover structure of FIG. 1 without the hinge mechanism.
Figure 5:
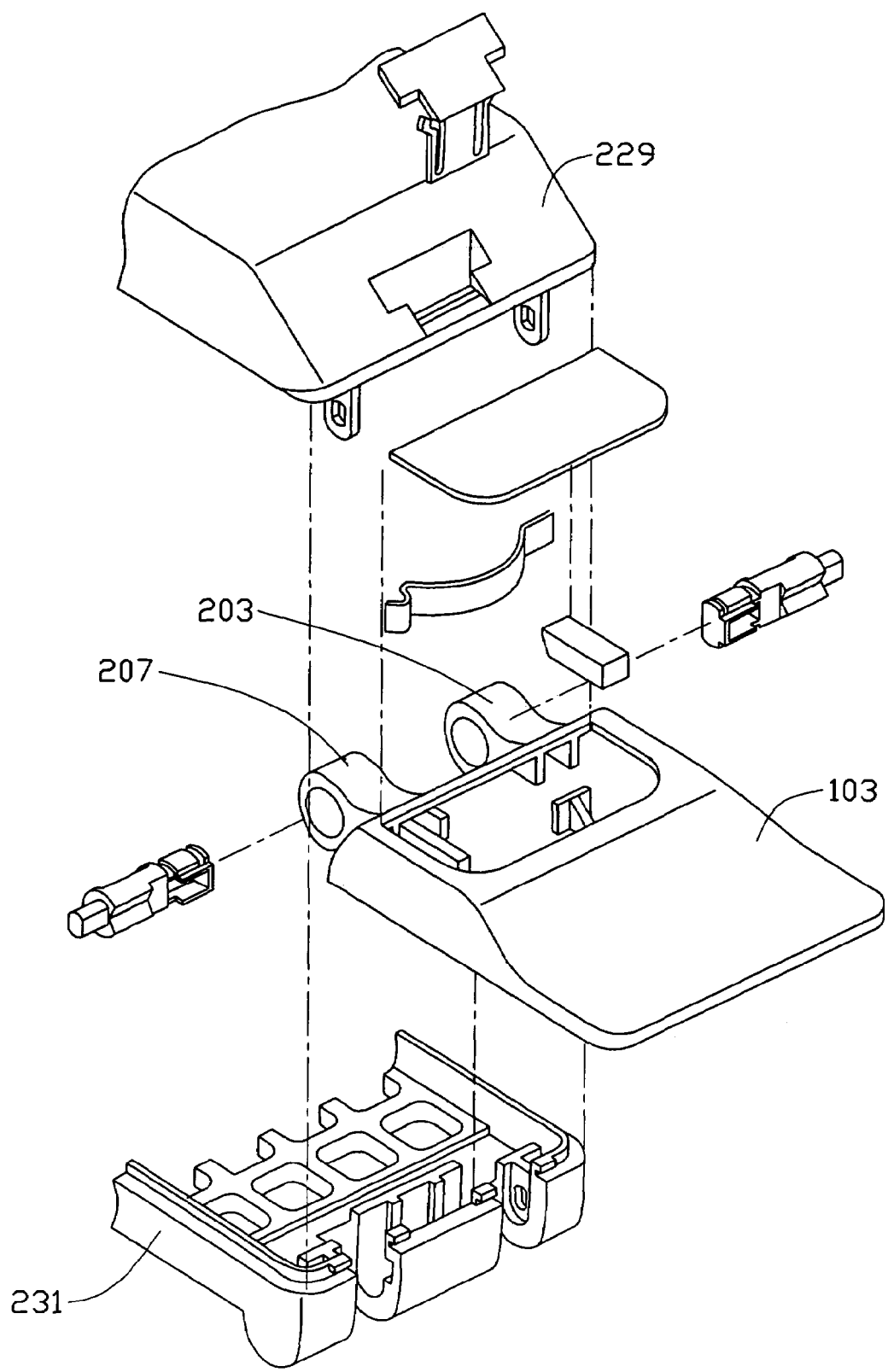
FIG. 5 is an exploded, isometric view of a first conventional cover structure.
Figure 6:
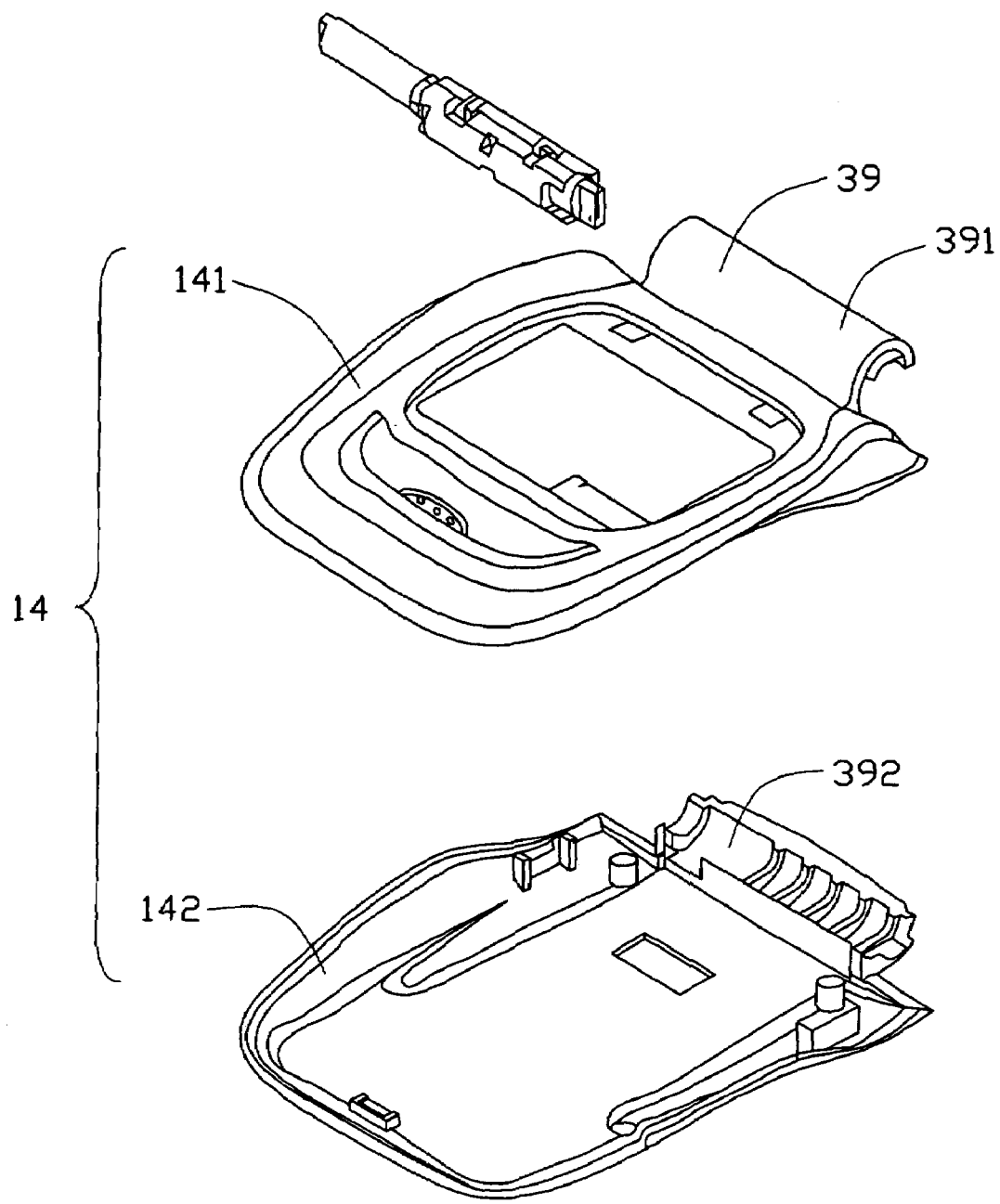
FIG. 6 is an exploded, isometric view of a second conventional cover structure.

Referring to FIG. 4 together with FIGS. 2 and 3, to assemble the flip cover 1, the back cover 20 is fixed to the front cover 10. The first and second receiving spaces 115, 215 form a housing receptacle to retain electronic elements, such as the LCD display 13, the earpiece (not shown) and associated circuitry. The mating shell 22 covers the recessed portion 1210 to form the knuckle 12. In the knuckle 12, the first and second support necks 123, 221 closely abut each other. Thus the screw holes in the screw hole posts 126 align with the bolt holes in the bolt hole posts 226, and the post 127 is fixed by the holding block 227. The curved plate 222 fits in the recessed portion 1210 of the arcuate wall 121, and the projections 225 are respectively retained in the openings 125. Thus the inner face 2220 of the curved plate 222 abuts the recessed portion 1210, with the second edge 2221 pressing close to the first edge 1212 thereby forming a regular dividing line 3 in the knuckle 12. Then, an assembler extends the screws 30 through the bolt holes of the bolt hole posts 226 and engages the screws 30 in the screw holes of the screw hole posts 126 to thereby fix the front cover 10 and the back cover 20 together. The two caps 31 are used to respectively cover the heads of the screws 30 to protect the screws 30 from erosion or damage. Thus, the flip cover 1 is obtained. Combining the flip cover 1 with the main body by way of the hinge mechanism 2 thus forms the folding mobile phone.

The first edge 1212 of the main joint portion 120 can be designed as a perpendicular, a slanted, or a curved surface with respect to the recessed portion 1210, and the second edge 2221 of the mating shell 22 would correspondingly be designed as a perpendicular, a slanted, or a curved section. Thus, viewed from the side (along an axis of the circular channel 124), the junction of the first edge 1212 and second edge 2221 can be upstanding, slanted at an angle, or curved. Furthermore, a path along a top of the knuckle 12 defined by the first edge 1212 and second edge 2221 can be designed such that the dividing line 3 can be a straight line or follow a bent path (such as a wavy line, a sawtooth configuration, or any other configuration to satisfy stylistic considerations).

One or more than one openings 125 and a corresponding numbers of projections 225 can be used to meet requirements. One or more than one screw hole posts 126, bolt hole posts 226, screws 30, and caps 31 can be used, as desired. A plurality of rectangular posts 127 and holding blocks 227 can also be used. Other fastening means, such as clips, can be used to take the place of projections 225 engaging with openings 125, screws engaging with holes, or posts 127 engaging with holding blocks 227. The fastening means can be located in any workable position in the flip cover 1.

The flip cover 1 is durable and very difficult to break when rotating about the hinge mechanism 2 between closed and open positions of the folding mobile phone. This is because the front cover 10 and the back cover 20 are tightly fixed together as described above, with the knuckle 12 being formed by way of the mating shell 22 closely fitting with the main joint portion 120 and being held in position thereat, and because the main joint portion 120 is a single, integral unit which defines the channel 124 for retaining the hinge mechanism 2. The flip cover 1 can have the front cover 10 of one color and the back cover 20 of another color. Thus the flip cover 1 can be two-colored or multi-colored and yet retain a distinct color boundary between adjacent colors. The boundary is defined by adjoining extremities of the covers 10, 20, including the dividing line 3.

The cover structure of the present invention can also be used in the main body cover structure of a mobile phone, if the knuckle 12 is properly designed, or can be used in other portable electronic devices.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A cover structure for a portable electronic device, comprising:

a back cover; and a front cover;

wherein, said front cover forms a unitary main joint portion, said back cover forms a shell, said main joint portion has a channel extending therethrough and a recessed portion formed at an outer surface thereof, and when said back and front covers are assembled, a knuckle is formed by means of said shell engaging with said main joint portion at said recessed portion thereof.

2. The cover structure as claimed in claim 1, wherein said main joint portion forms a protruding portion on the outer surface thereof, and the protruding portion has a first edge adjacent said recessed portion, said shell has a second edge, and when assembling the cover structure, said back cover mates with said front cover, said shell fits to said recessed portion, and said second edge presses close against said first edge to form a distinct dividing line therebetween.

3. The cover structure as claimed in claim 2, wherein the cover structure forms different colors on said front cover and said back cover with a distinct and regular boundary including said dividing line.

4. The cover structure as claimed in claim 2, wherein said shell comprises a curved plate with said second edge, and said curved plate can closely fit in said recessed portion of the arcuate wall of said main joint portion.

5. The cover structure as claimed in claim 1, wherein the knuckle has a fastening means to fix said shell on said main joint portion.

6. The cover structure as claimed in claim 5, wherein said fastening means comprises at least one opening formed in said recessed portion, and at least one projection extending forwardly from the inside of said shell, and when the cover structure is assembled, the projection is fixed in the opening.

7. The cover structure as claimed in claim 5, wherein said fastening means comprises any one or more of clamping clips, screws engaging in holes, and posts engaging with holding blocks.

8. The cover structure as claimed in claim 1, wherein said main joint portion is substantially a casing tube comprising an arcuate wall and a support neck, and said arcuate wall and said support neck cooperatively define said channel.

9. The cover structure as claimed in claim 1, further including a fastening means to further fasten said back cover to said front cover at any workable position of the cover structure.

10. A cover structure for a portable electronic device with a hinge mechanism, comprising:
   a back cover; and
   a front cover;
   wherein a knuckle extends from a foot of the cover structure to join said back and front covers together, said knuckle comprises a main joint portion formed on said front cover and a shell formed on said back cover for covering said main joint portion, said main joint portion comprises a single casing tube defining a channel extending therethrough, said channel is configured to receive said hinge mechanism, said main joint portion forms a recessed portion thereon for receiving said shell, and a distinct dividing line is formed at the joint of said shell and said main joint portion along said knuckle.

11. The cover structure as claimed in claim 10, further including a fastening means to fix said shell on said main joint portion.

12. The cover structure as claimed in claim 11, wherein said fastening means comprises any one or more of projections engaging in openings, clamping clips, screws engaging in holes, or posts engaging with holding blocks.

13. A cover structure for use with a hinged device, comprising:
   opposite first and second halves coupled to each other face to face and commonly defining an interior space,
   the first half defining a unitary knuckle portion with a columnar channel extending therethrough, said knuckle portion defining an outward arcuate wall,
   the second half having an inward arcuate mating shell at least partially circumferentially compliantly covering and supportably seated upon said outward arcuate wall, and
   one of said first and second halves defining an opening and the other of said first and second halves defining a projection engaged within the opening so as to prevent relative axial and circumferential movement between said first and second halves; wherein
   said knuckle portion defines a groove for communication between the channel and said interior space.

* * * * *